March 22, 1966   W. LASTING   3,242,481
DISTRESS AND CODE SIGNALING DEVICE
Filed Jan. 20, 1964   3 Sheets-Sheet 1

INVENTOR.
Walter Lasting

INVENTOR.

Walter Lasting

March 22, 1966      W. LASTING      3,242,481

DISTRESS AND CODE SIGNALING DEVICE

Filed Jan. 20, 1964      3 Sheets-Sheet 3

INVENTOR.

Walter Lasting

United States Patent Office 3,242,481
Patented Mar. 22, 1966

3,242,481
DISTRESS AND CODE SIGNALING DEVICE
Walter Lasting, 111—33 116th St., Richmond Hill, N.Y.
Filed Jan. 20, 1964, Ser. No. 338,850
4 Claims. (Cl. 340—366)

The present invention, while broadly relating to visual signaling in general, has more particular reference to a distress and code signaling device for use in emergencies by motorists on the highways and skippers of disabled water-craft.

A main object of the invention is the provision of a signaling means whereby intermittent flashing from a stalled vehicle of a selected one of a plurality of colored lights used in a known code will be, not only a warning sign for caution, but, of itself, a communication to others as to the cause of distress and the particular kind of assistance the signaling calls for.

Another object of the invention is the provision of a simple, inexpensive, efficient and practical signaling device for the purpose set forth which is easy to use and always readily available in that it is of few parts, compact in structure and can be conveniently stored in a comparatively small space such as the glove compartment of an automobile.

Another object of the invention is the provision of a signaling means in the form of a utility lantern to be held in the hand or stood on the ground and having a plurality of means for removably attaching it to the body of a stalled vehicle, one of such means being a magnetized base plate.

A further object of the invention is the provision in a signaling device having a single blinker light bulb and surrounding reflector of a rotatably supported mounting for a plurality of colored plastic or glass domes any one of which, or any adjacent pair, may be moved into position for illumination by the light source. This is a valuable feature in that it permits use of the invention in code signaling involving the simultaneous flashing of two colors such as from one vehicle to another by military or other transport. For instance, the operator of a stalled vehicle in a motor transport, military or otherwise, can without interfering with movement of other vehicles express his needs by flashing any of a plurality of code messages as (1) we need a tow; (2) we need a mechanic; or (3) we need an ambulance; etc.

A further object of the invention is, instead of using batteries contained within the lantern body as the power source for lighting the blinker bulb, to employ an electric circuit including a connector removably insertable in a socket such as that for a cigarette lighter, having connection with the battery of a motor vehicle.

And, a still further object of the invention is the employment of a flashlight in conjunction with the signal lantern, the light bulbs of the two unitary devices being included in a circuit, as just above described, and the body member of the flashlight including a magnetic plate whereby it is attachable anywhere and in any direction on the inside, outside, top or bottom of a stalled vehicle. In this manner, and if need be held in a fixed position, the flashlight is employed to illuminate an area about a stalled vehicle while the distress signal is in operation and thus minimize the danger of a person being struck by an oncoming vehicle while attempting to fix an emergency, such as changing a tire.

The accompanying drawings illustrating the invention and forming a part of the specification are as follows.

Figures 1, 2, 3:
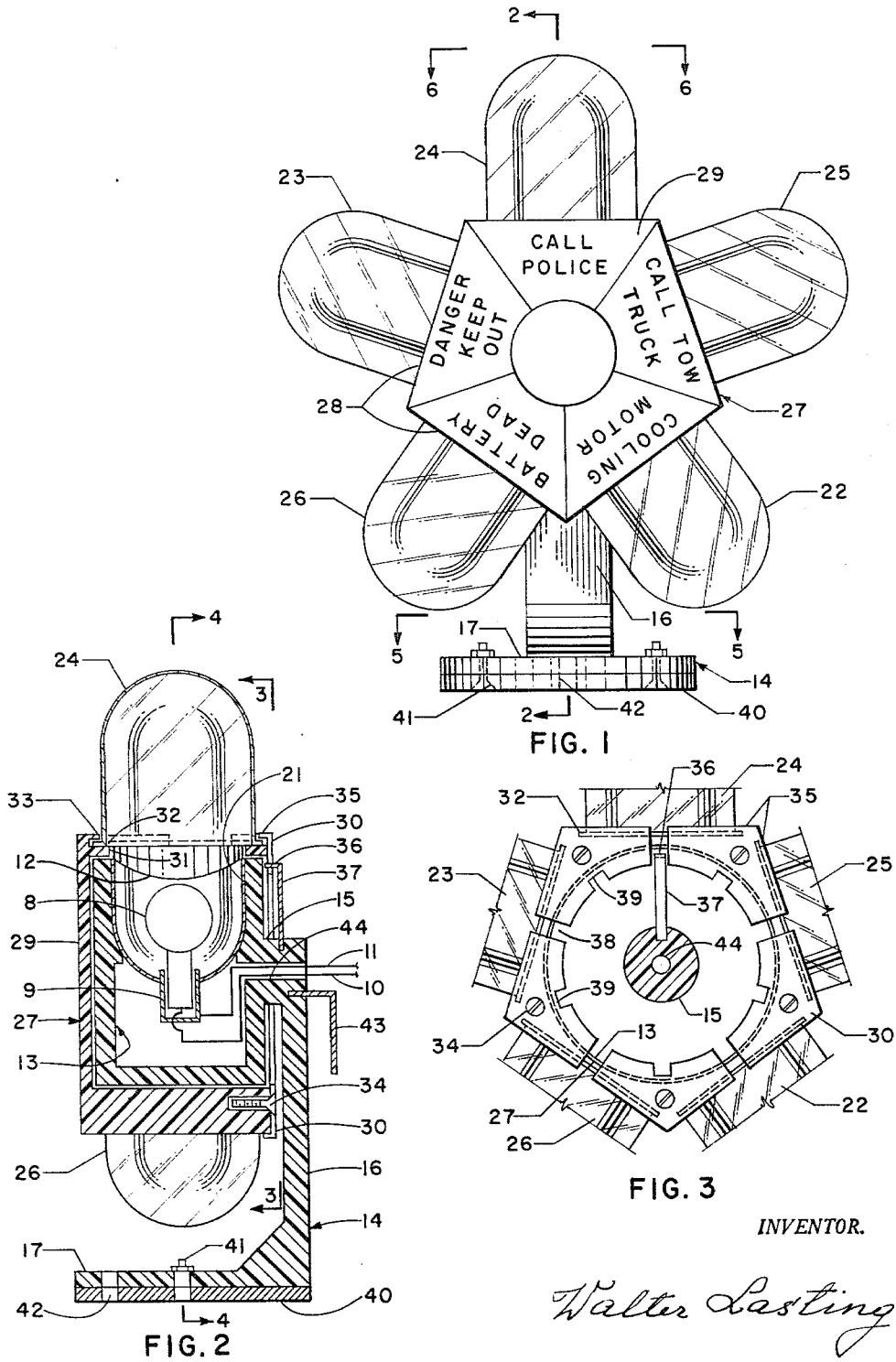
FIG. 1 is a view of the signaling device in front elevation.
FIG. 2 is a vertical sectional view on line 2—2 of FIG. 1.
FIG. 3 is a vertical sectional view on line 3—3 of FIG. 2.

It is to be understood that the drawings are for the purpose of illustration only and that such changes in structure and operation may be made as do not depart from the spirit and scope of the invention as set forth in the following detailed description and particularly defined in the appended claims.

In the drawings similar reference numerals refer to similar parts throughout the several views.

A blinker bulb 8 removably insertable in a socket 9 having connection through wires 10 and 11 with a source of electrical supply, as will be explained, is the source of light for the signaling device.

This socket 9 protrudes through an opening in the bottom of a cup-shaped reflector 12 with which it forms an integral part and is axially aligned, the geometric form of the reflector being such as to produce the desired reflection spread.

A hollow cylindrical member 13 comprises the head portion of a standard generally indicated by numeral 14, the rear or inner wall of the head 13 being formed with a short stud-like protrusion 15 also integral with an upstanding arm or post 16 and whereby the two members 13 and 16 are spaced in fixed parallel relation. The post 16 terminates at its lower end in a foot piece or base 17 extending laterally underneath the head 13. The peripheral wall of the stationary head 13 at the top has a somewhat thickened portion 20 through which there is a slightly tapered bore 21 for receiving the reflector 12 and in which the open upper end of the reflector is seated. The head 13 constitutes a housing for the reflector 12, socket 9 and bulb 8 assembly.

The signaling device carries a plurality of, in this instance five, glass or plastic domes, one of which 22 preferably is white while each of the others 23, 24, 25 and 26 is of a color such as red, yellow, green and blue, respectively. A common mounting 27 for the five domes is a pentagon, the axis of each dome being perpendicular to a respective side 28 of such member 27. The fixed head 13 of the standard 14 provides a bearing on which the member 27, by manual manipulation is rotated to bring any selected one of the domes into axial alignment with the opening 21 to the reflector 12 and consequently illuminated by the blinker bulb 8. A front wall 29 and corner plates 30, the latter providing a partial closure for the open rear face of the member 27, prevent relative axial movement of the parts 13 and 27. Extending through each side face 28 of the rotary member 27, and on which one of the aforementioned domes is mounted, is a light opening 31 of substantially like diameter as that of the inner peripheral edge of an outwardly turned flange 32 on the open abutting end of its corresponding dome.

Figure 4:
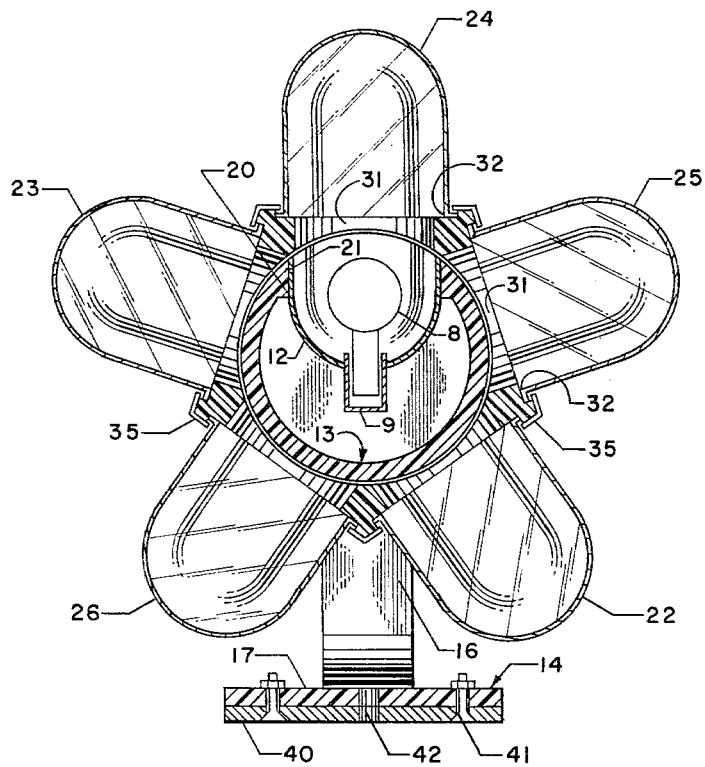
FIG. 4 is a vertical sectional view on line 4—4 of FIG. 2.
Figure 5:
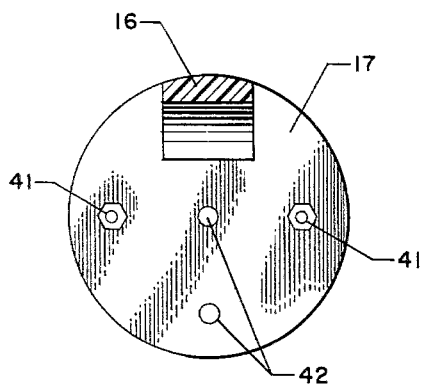
FIG. 5 is a transverse sectional view on line 5—5 of FIG. 1.
Figure 6:
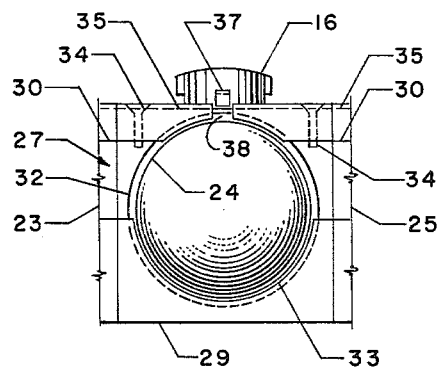
FIG. 6 is a top plan as viewed in the direction of the arrows from line 6—6 of FIG. 1, the outer portions of all visible domes, except the top one, being broken away as in FIG. 3.
Figure 7:
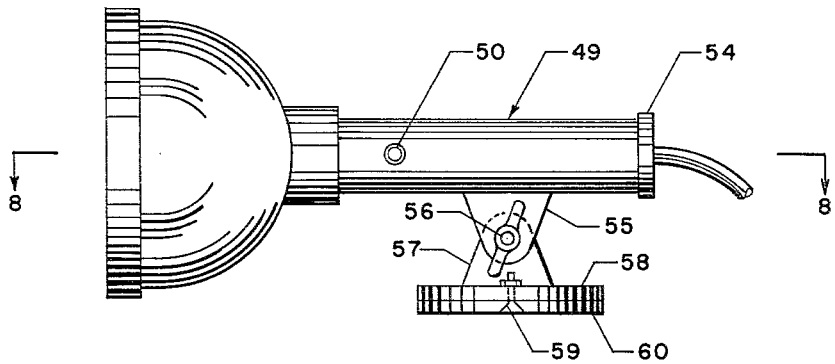
FIG. 7 is a side view of a preferred flashlight for use in conjunction with the signaling device.

The means for releasably locking each dome to its respective side 28 of the rotary member 27 is as follows:

By reference to FIGS. 4 and 6 it will be observed that the front portion of what is the top side 28, in these views, is raised slightly with respect to the remaining portion and that the segmental part of the opening 31 lying within such raised portion is undercut to provide a holding flange 33 under which practically one half of the dome flange 32 engages. The corner plates 30 are secured to the rear edge portions of the sides 28 by screws 34, see FIG. 3, each plate 30 being formed with a laterally turned flange 35 angularly bent midway between its side edges to provide two portions each of which functions as a clamp, one engaging a segmental portion and the other a like portion of the flanges 32 of two adjacent domes.

A detent 36 on a spring arm 37 secured to the fixed head 13, see FIGS. 2 and 3, yieldingly holds the mounting 27 against rotary movement, when a selected one of the domes has been moved to lighting position, by engagement in a slot opening 38 between adjacent plates 30. Likewise regularly spaced openings 39, one in each plate 30, FIG. 3, are provided to similarly lock the member 27 against rotation by receiving the detent 36 when two adjacent domes are rotated to position for simultaneous lighting.

For conveniently attaching the signaling device in any position to a metal body, the base 17 is shown as having a magnetized plate 40 secured to its under surface by bolts 41. The signaling lantern device will stand by itself or means for supporting it, other than the magnet 40 may be provided such as mounting holes 42 in the base 17 for receiving upstanding or lateral studs, or a mounting hook 43 such as seen in FIG. 2 attaching to the arm 6.

Lines radiating from the axis of the mounting 27 to its five corners subdivide the face of such member into substantially triangular spaces as shown and in which, for a predetermined code, there may be printing designating the meaning for the particular color of light being flashed. A simple code that would soon become generally understood by the motoring public might be as follows:

Red—would signify danger and be a warning to keep away for the protection of a person changing a tire or making repairs; yellow—an accident, call police; green—notify gas station or garage for a push or battery booster; blue—mechanical failure, need tow truck; white—cooling motor, no assistance required. And, the flashing of two lights simultaneously, from the positioning of two adjacent domes in the manner hereinabove described, may be employed for signaling code messages from car to car in motor transport.

Figure 8:
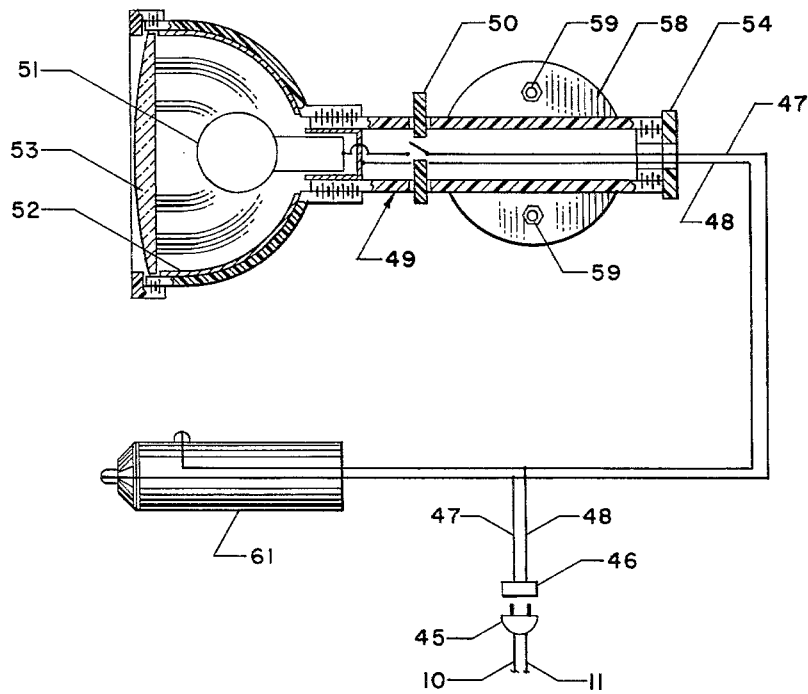
FIG. 8 is a longitudinal sectional view on line 8—8 of FIG. 7 with electrical circuit connections shown in diagram.

The wires 10 and 11 leading from the lamp socket 9 are conducted through an opening 44 in the standard 14 and connected to any suitable source of power. Preferably they are connected through plug 45 and socket 46 to the circuit wires 47 and 48 of a flashlight particularly designed for use as a unit in conjunction with the instant invention. The wires 47 and 48 also connect with a plug 61, FIG. 8 removably insertable in a socket, not shown, having connection with the battery of the motor vehicle, the otherwise normal use of such latter socket being for a cigarette lighter.

The flashlight unit has the usual tubular handle portion 49, finger operated switch 50, light bulb 51, reflector 52 and lens 53, the bulb and lens being relatively adjustable. A screw plug 54 in the handle 49 has an opening for receiving the wires 47 and 48. For the purpose of supporting the flashlight in the manner and for the reason given in the objects of the invention, a lug 55 on the tubular part 49 has a frictional, pivotal connection by pin 56 with an upstanding lug 57 on a base member 58 which by bolts 59 has a magnetic plate 60 attached to its under surface.

It is believed that from the foregoing the construction and operation of the invention has been made sufficiently clear as to call for no further explanation. However, while not disclosed specically in the drawings or description, it may be noted that the functions of the invention are such as to make it useful on a moving as well as a stalled vehicle and, to that end, a structure embodying the invention could be built into the body of an automobile or water-craft.

What I claim is:

1. In an electrical device for distress and code signaling the combination, with a standard including a hollow cylindrical bearing having an opening in its peripheral wall, of a cup-shaped reflector seated in said opening, a socket in said reflector for a blinker bulb and terminal wires leading from said socket, a mounting rotatable on said bearing and having a plurality of circumferentially spaced light openings for selective registry axially with said bearing opening, a luminous dome as a cover for each of said light openings and interengaging means on said mounting and said domes for detachably holding the said domes in their respective positions on said mounting.

2. A signaling device according to claim 1 characterized by said standard also including a base, a post upstanding from said base, and by said bearing a lateral extension from said post.

3. A signaling device according to claim 1 characterized by said mounting being a sleeve axially slidable on said bearing in assembly of the parts and including fixed means for limiting such axial movement in one direction and detachable corner pieces preventing its displacement by axial movement in the opposite direction.

4. A signaling device according to claim 1 characterized by said interengaging means comprising an outwardly turned annular flange on each of said domes, a raised portion on the peripheral surface of said mounting providing a shoulder on each such dome flange forward of the axial plane of the domes, and means detachably secured to said mounting for clamping thereto the segmental portion of dome flange in rear of the said axial plane.

References Cited by the Examiner

UNITED STATES PATENTS

| | | | |
|---|---|---|---|
| 1,752,122 | 3/1930 | Thieler | 340—125 |
| 1,938,679 | 12/1933 | Anderson | 340—366 X |
| 2,812,423 | 11/1957 | Penna | 240—8.18 |
| 2,843,952 | 7/1958 | Zgraggen | 40—52 |
| 2,908,900 | 10/1959 | Gordon et al. | 340—325 |
| 2,987,702 | 6/1961 | Yohe | 340—366 X |

NEIL C. READ, *Primary Examiner.*

W. GLEICHMAN, I. J. LEVIN, *Assistant Examiners.*